(12) United States Patent
Cok

(10) Patent No.: US 6,999,045 B2
(45) Date of Patent: Feb. 14, 2006

(54) ELECTRONIC SYSTEM FOR TILED DISPLAYS

(75) Inventor: Ronald S. Cok, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 130 days.

(21) Appl. No.: 10/192,866

(22) Filed: Jul. 10, 2002

(65) Prior Publication Data

US 2004/0008155 A1    Jan. 15, 2004

(51) Int. Cl.
G09G 5/00    (2006.01)
(52) U.S. Cl. .......................... 345/1.3; 345/1.1
(58) Field of Classification Search ........... 345/1.1, 345/1.3, 3.3, 660, 903, 1.2
See application file for complete search history.

(56) References Cited

U.S. PATENT DOCUMENTS

| | | | |
|---|---|---|---|
| 4,368,467 A * | 1/1983 | Unotoro et al. ............ 345/1.3 |
| 4,613,210 A | 9/1986 | Pollard |
| 4,682,162 A * | 7/1987 | Holloman .................. 345/82 |
| 5,523,769 A * | 6/1996 | Lauer et al. ............... 345/1.3 |
| 5,657,046 A * | 8/1997 | Noble et al. .............. 345/684 |
| 5,889,568 A | 3/1999 | Seraphim et al. |
| 5,956,000 A | 9/1999 | Kreitman et al. |
| 6,274,978 B1 | 8/2001 | Roach et al. |
| 6,292,157 B1 | 9/2001 | Greene et al. |
| 6,297,787 B1 | 10/2001 | Nishida |
| 6,396,985 B2 | 5/2002 | Lowry et al. |
| 6,570,546 B1 * | 5/2003 | Welker et al. ............. 345/1.1 |
| 6,580,404 B1 * | 6/2003 | Ishihara ..................... 345/1.3 |
| 2001/0038387 A1 | 11/2001 | Tomooka et al. |
| 2002/0003592 A1 | 1/2002 | Hett et al. |

FOREIGN PATENT DOCUMENTS

| | | |
|---|---|---|
| EP | 0 179 913 B1 | 3/1985 |
| EP | 0 731 436 | 9/1996 |
| EP | 0 933 753 | 8/1999 |
| WO | WO 94/17637 | 8/1994 |

* cited by examiner

Primary Examiner—Lun-Yi Lao
Assistant Examiner—Tom Sheng
(74) Attorney, Agent, or Firm—Andrew J. Anderson; Thomas H. Close

(57) ABSTRACT

A tiled display includes a display controller for receiving image data from an image data source and formatting the image data for display, a plurality of display tiles having an array of display pixels, a tile controller, a clock, a memory and a communication interface; and the display tiles being serially connected through the communication interfaces, with one display tile being connected to the display controller, the display controller sending image data for an entire image to the one display tile, and each display tile successively storing a portion of image data to be display and transmitting any remaining image data to the next display tile in the series.

10 Claims, 4 Drawing Sheets

ELECTRONIC SYSTEM FOR TILED DISPLAYS

FIELD OF THE INVENTION

The present invention relates to flat-panel display systems composed of multiple tiles and, more particularly, to the electronic system necessary to supply signals to the display.

BACKGROUND OF THE INVENTION

Electronic display systems are commonly used to display information from computers. Typical display systems range in size from small displays used in mobile devices to very large displays visible to thousands of viewers. Large displays are sometimes created from tiling smaller display devices together. For example, video walls using multiple video displays are frequently seen in the electronic media and flat-panel displays are tiled to create larger displays. Multiple projector systems used to create a large, tiled, high-resolution display are also available.

A projector system utilizing basic projection units connected separately to each tile is described in U.S. Pat. No. 5,956,000, issued Sep. 21, 1999 to Kreitman et al. As an alternative design, U.S. Pat. No. 5,889,568, issued Mar. 30, 1999 to Seraphim et al. describes a system in which the individual control lines for each tiled display unit are connected to a central controller through interconnections on adjoining tiles. Yet another design is illustrated in FIG. 8 of WO 94/17637, published Aug. 4, 1994 by Lewis wherein an electronic control system receives one or more video input signals, digitizes the input video signal, and provides a digitized signal to each of a plurality of video display units. In each of these designs, a direct connection is made from a controlling device to each display tile individually. This kind of point-to-point connection is efficient and simple for small numbers of tiles but becomes impractical with larger numbers of tiles. Both wiring concerns and control issues become problematic since they continually increase as the number of tiles increases. Moreover, the design described in U.S. Pat. No. 5,889,568, referenced above, requires a back plate common to all of the tiles and it is quite difficult to replace faulty tiles. This makes the production and maintenance of large systems difficult and expensive. In addition, the designs described must be adjusted for each possible system size and are not readily expanded or configured.

U.S. patent application Ser. No. 2001/0038387 A1, published Nov. 8, 2001 by Tomooka et al., discloses a tiled display that employs packetized communication over a common bus to achieve a display interface that can accommodate new and larger displays without the need for redesign. Each display panel in the tiled display is provided with a panel control chip and a panel memory connected to the panel control chip. Referring to FIG. 2, the tiled display disclosed by Tomooka et al. includes a display controller 12 which receives image data from a source of image data 14, packetizes the image data and transmits the data packets to a plurality of display tiles 10 over a common bus 13.

A problem with this approach is that as the size of the tiled display grows larger, the overhead associated with the use of packetized communication on a common bus becomes a bandwidth limitation. Additionally, the physical implementation of a common bus in a tiled array becomes problematic as the number of tiles connected to the common bus increases.

There is a need therefore for an improved tiled display system that overcomes the problems noted above.

SUMMARY OF THE INVENTION

The need is met according to the present invention by providing a tiled display that includes a display controller for receiving image data from an image data source and formatting the image data for display; and a plurality of serially connected display tiles, one display tile being connected to the display controller, and each display tile including an array of display pixels, a tile controller and a memory.

ADVANTAGES

The present invention has the advantage that the tiled display is more easily scaled, has a simpler communication protocol and does not require a common bus structure or clock signal for implementation.

DETAILED DESCRIPTION OF THE INVENTION

An improved design for providing data signals to a tiled display that is expansible, readily scales to larger size tile arrays, does not require a single common hardware connection device and can be self-configured, is provided through the use of a serial electronic connection from one display tile to the next and originating from a single controller. Each display tile is connected to two neighbors and communicates with each neighbor. A display tile at the end of the series of display tiles will only communicate with the single neighbor to which it is connected.

Figure 1:
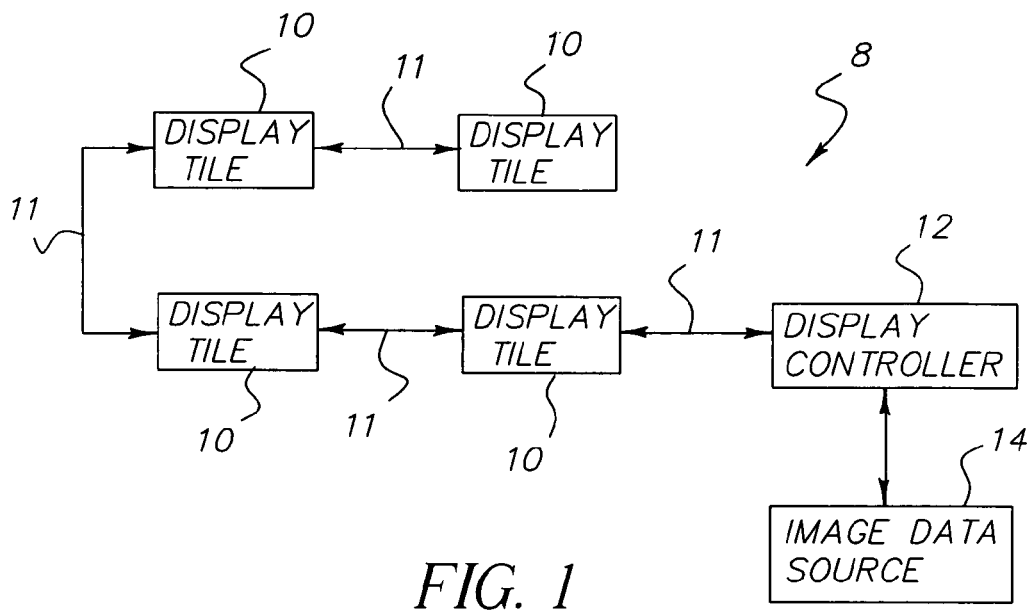
FIG. 1 is a schematic diagram of a tiled display having serial data communication between tiles according to the present invention.
Figure 2:
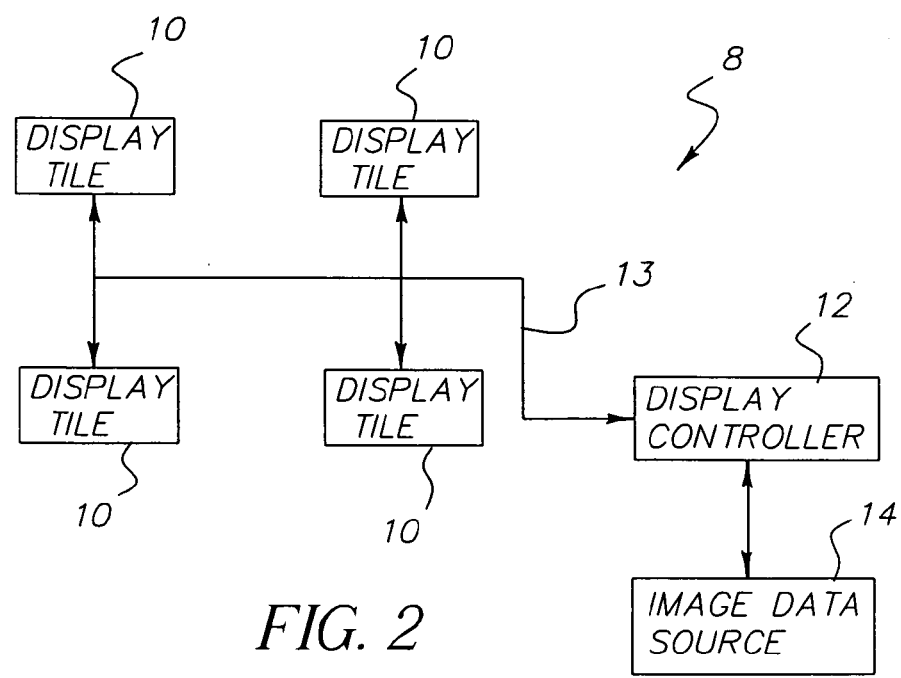
FIG. 2 is a schematic diagram of a prior art tiled display having parallel image data communication to the tiles of the display over a common bus.
Figure 3:
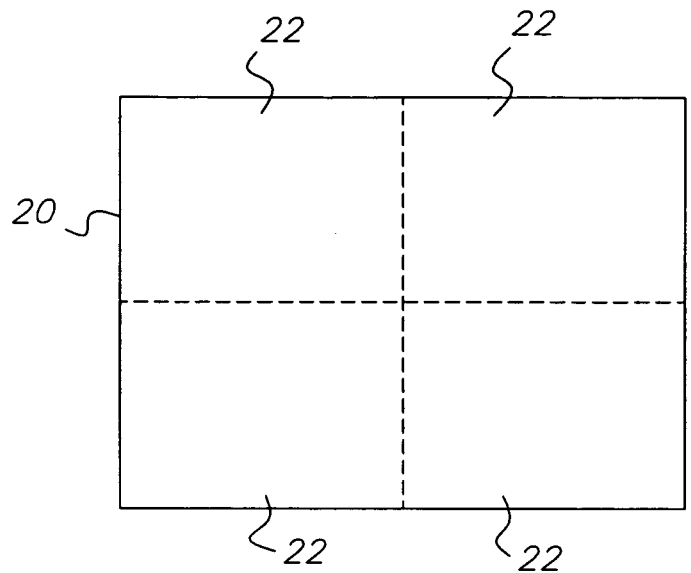
FIG. 3 is a schematic diagram showing a tiled image produced by the displays of FIGS. 1 and 2.

Referring to FIG. 1, a two-dimensional array of serially connected display tiles 10 are connected through communication channels 11 to form a tiled display 8. The communication channels between the neighboring tiles may be implemented using a conventional serial or parallel protocol. The first display tile in the series is connected to a display controller 12 that receives image data from an image data source 14. The image data source 14 may be a storage device, such as a computer hard drive, optical disk, or an interface to communications gear such as television signals, etc., as is well known in the art. Each display tile 10 displays a portion of an image 20 that is divided into portions 22, each portion of which is displayed by a corresponding one of the display tiles 10.

The display controller 12 formats the image data into a stream and transmits image data for the full image 20 to the display tile 10 to which it is connected, without regard for the number or arrangement of display tiles in the display. The image data to be displayed by the first tile is stored in a local memory in the first tile and the remainder of the image data is passed to the next display tile in the series. The next display tile in the series stores the image data that it will display and transmits the remainder of the image data to the next display tile in the series. When a display tile in the series receives the portion of image data it is to display, it may display its portion of the image data.

Figure 4:
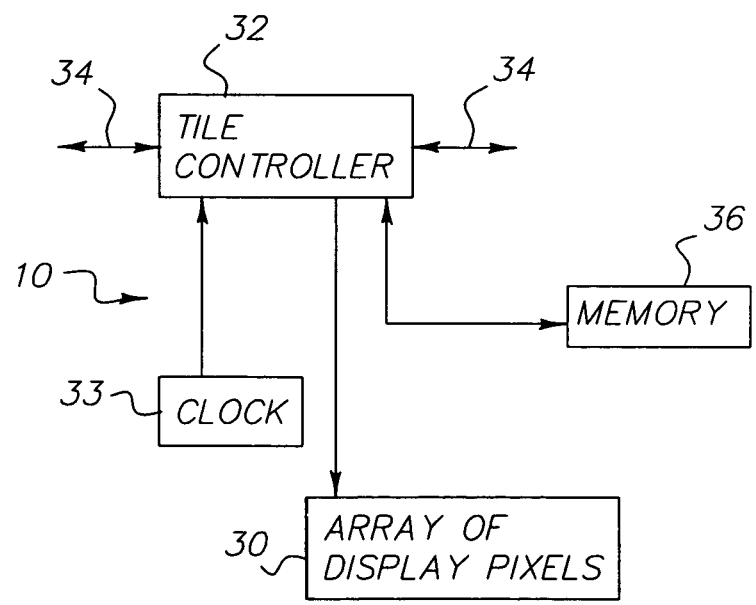
FIG. 4 is a schematic block diagram showing a display tile employed in the present invention.

Referring to FIG. 4, each display tile 10 includes an array 30 of display pixels, a tile controller 32, a clock 33, communication interfaces 34 to neighboring display tiles, and a memory 36 for storing the portion of the image data that is to be displayed by the display tile. The array of display pixels can be provided, for example by a projector (such as a CRT or micro-mirror device), or a flat-panel display device (such as a liquid crystal display or an electroluminescent display panel, such as an organic light emitting diode OLED display panel). The communication interfaces are conventional (e.g. registers with drivers) as is the local storage (e.g. SRAM, double-buffered memories, and video RAM). The tile controller 32 employs conventional digital logic to determine what portion of the image data to store in memory 36, to display, and to control the display of image data from the memory and to manage the communications between display tiles.

In operation, the display controller 12 receives image data from the image source 14. The image data is formatted by the display controller 12 into a serial data stream; for example the image pixels are sequentially ordered within a row and the rows are sequentially ordered. The rows of image pixels are passed along the series of display tiles. Each display tile stores that portion of the image data for which it is responsible and transmits the rest of the image data, if any, to the next display tile in the series. Thus, in the example shown in FIG. 1, the first display tile in the series will pass all but the lower right hand portion of the image data to the next display tile. The tile controllers 32 are programmed to compute the portions of the image to be stored locally and to take appropriate actions with regard to enlargement, reduction, cropping, etc. depending on the image size, display size and display configuration.

In one embodiment, the memory 36 contains only the portion of the image that is currently being transmitted, for example only one portion of a line. When the next line is received, the portion of the line to be displayed replaces the previous portion stored in the memory 36. Alternatively, the memory 36 on each display tile is sufficiently large to store a complete portion 22 of the total image. Image memory circuits (such as video RAM) as are well known in the art are employed to accomplish this task. Moreover, the local memory 36 may be made large enough to double buffer the image data so that one image portion may be displayed from the local memory while another image portion is being transmitted. Well known double buffering techniques can be employed with either embodiment. Double buffering reduces communication data rates between display tiles while increasing local storage needs.

Prior to transmitting image data, all of the information needed for each tile controller 32 to operate the display may be input to the display controller 12 and communicated from the display controller 12 to the tile controllers 32. Alternatively some of the information may be calculated in a preliminary configuration protocol by communicating a count of zero from the display controller 12 to the first display tile together with information about the image size to be displayed. Each tile controller 32 then increments the count and passes it to its neighbor until the entire series of display tiles has been counted. The last tile in the series senses that it is the last tile when it cannot perform a communication with a next tile in the series. The last tile then returns the total count back to the display controller 12 through the series. Each tile controller 32 stores the total count. Using a common algorithm, each tile controller 32 then computes the size and configuration of the array and its own position within the array which is then used to determine the location of its local image portion in the image data. As image data is passed through the series of display tiles, the tile controllers 32 store or forward the appropriate image data portions. For example, given a specified aspect ratio and predetermined communication pattern, the tile controllers 32 compute the square root of the display tile count and round it to X, Y values to determine the configuration. Alternatively, the display controller 12 may compute the size and location of image portions and communicate the information to each display tile. This method is applicable to both one- and two-dimensional arrays of display tiles. The image size is communicated to the tile controllers 32 by the display controller 12, as well as any other information necessary for managing the system. The size of the tiled display 8 can be enlarged or reduced by changing the number of rows or columns of display tiles in the array. Calculation techniques to communicate and calculate the necessary information are described in detail in "Parallel Programs for the Transputer" by Ronald S. Cok, published by Prentice Hall, 1991.

In one embodiment, the display can display an image of any size within the limits of the communication bandwidth of the communication channels 11 and the size of the memory 36. The display tiles, using their configuration information, compute the size and location of the image data corresponding to their position in the display, store that portion of the image data corresponding to their position in the display and communicate those portions corresponding to the other display tiles. If the image size is larger than the display size, the portion of the image within the display tile is reduced for example by cropping or decimation. If the image size is smaller than the display size, the portion of the image within the display tile is enlarged, for example by interpolation. Specific instructions for how to handle the image are stored in the tile controllers 32. In an alternative embodiment, any reduction or enlargement of the image is performed by the display controller 12 prior to transmitting the image.

The present invention provides a simple, extensible design suitable for large arrays of tiles in a tiled display. Because the only communications are local between display tiles, there is no need for large, long buses with concomitant communications difficulties. The present invention can also, to a limited extent, accommodate partial failures in single display tiles. If a display tile is capable of communicating but cannot display individual pixels or entire tiles, the system can continue to function, albeit with portions of the image missing. This can be useful in situations where partial display is better than none at all. If a communication link 11 is broken, the system may be reconfigured to display an image with the available remaining display tiles.

Figure 5:
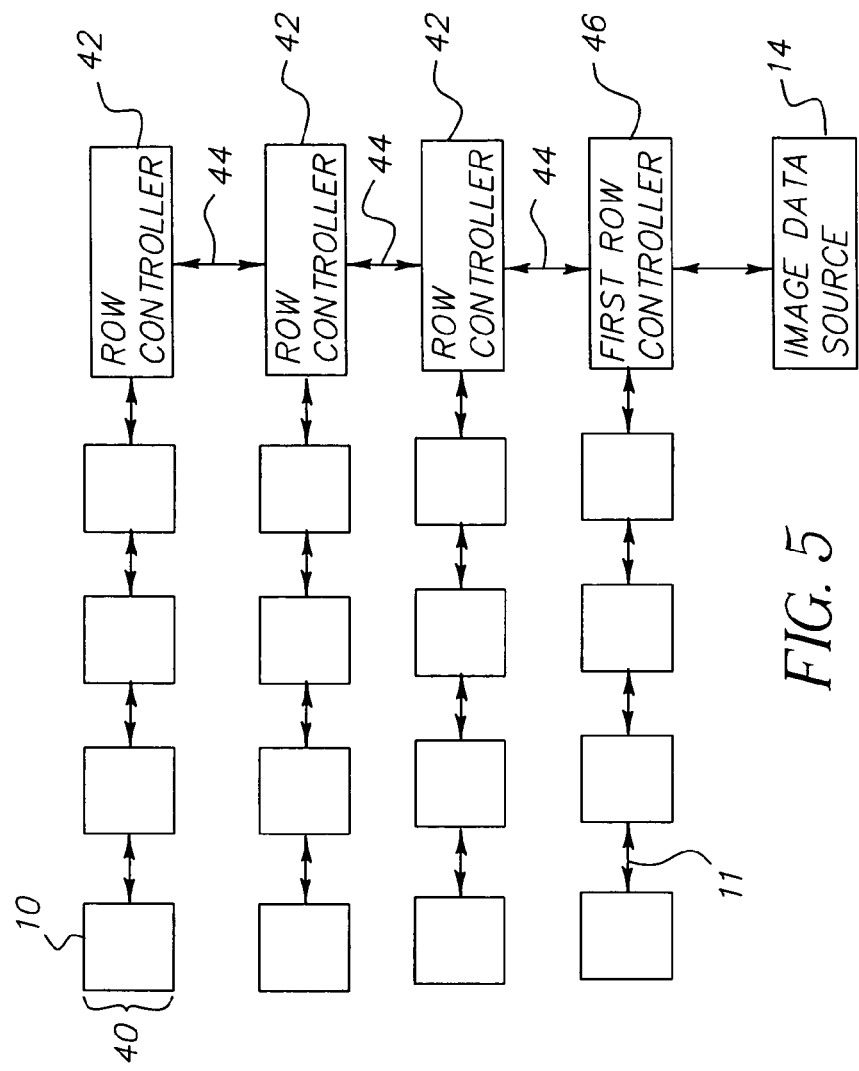
FIG. 5 is a schematic diagram of a tiled display device according to an alternative embodiment of the present invention.

Referring to FIG. 5, in an alternative embodiment for applications that have a high data rate requirement resulting from a large image size or high refresh rate, the local communication rate between display tiles can become quite large. In this situation, the present invention can accommodate this need by using a row controller 42 for each row of display tiles. These row controllers 42 have an additional high data rate communication channel 44 from one row controller to the next. A first row controller 46 is connected to the image source 14. In operation, the first row controller 46 sends the appropriate rows of image data to an associated series of display tiles and the other rows of image data to the next row controller, which behaves similarly. Thus, the image data is distributed to a series of rows of display tiles, the rows of display tiles also being connected in series.

Figure 6:
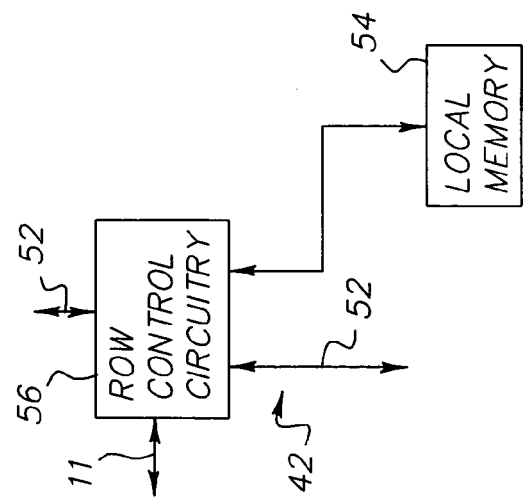
FIG. 6 is a schematic diagram of the row controller used in FIG. 5.

Referring to FIG. 6, the row controller 42 includes communications interfaces 52 and a communications interface 11 to its associated serially connected row 40 of display tiles 10, local memory 54, and row control circuitry 56.

Similar to the previous embodiment, all of the information needed for operating the row controllers 42 and the tile controllers 32 can be communicated from the first row controller 46, or some of the information can be calculated by communication between the row controllers to determine one dimension of the display and communication through the tile controllers in the rows to determine the second dimension. These dimensions are then communicated to the row controllers 42 and the tile controllers 32 so that they can determine their local position in the display array and communicate and store the appropriate local image data. The tiled display can accommodate partial display tile failures or change in size as described above. The row controllers 42, 46 may also incorporate a display tile that acts as the first display tile in the row.

The present invention is readily adapted to accommodate overlap between display tiles. For example, projection displays are often difficult to calibrate and perceptible differences between the tiles are visible. These differences can be mitigated by overlapping information between the tiles so that two tiles might, for example, each display the same data at half brightness. Each display tile simply stores a larger local data set and, at configuration, accommodates the local count of rows or columns correspondingly.

Figure 7:
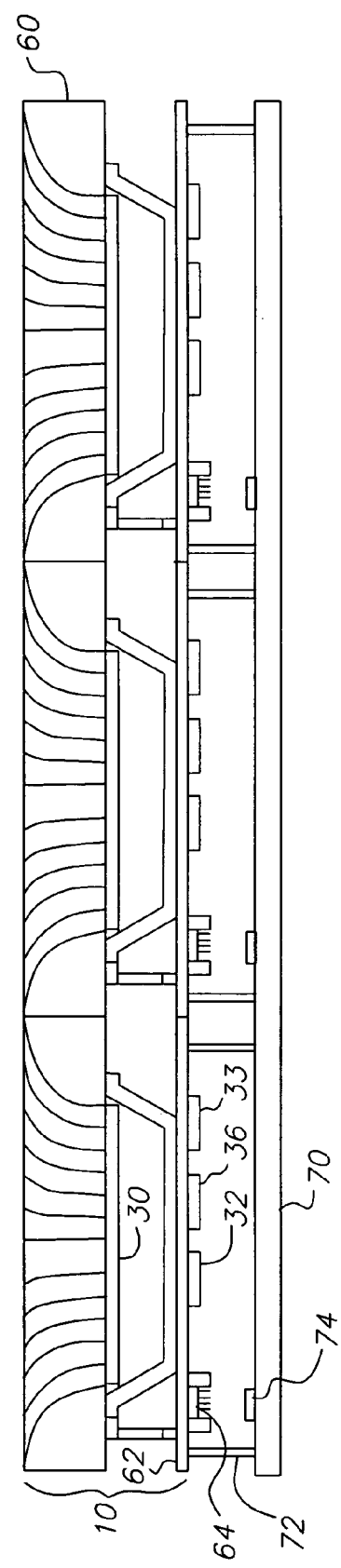
FIG. 7 is a side view of a tiled display according to one embodiment of the present invention.

Referring to FIG. 7, in a preferred implementation of the present invention, the components (30, 32, 33, 36) of the display tiles 10 are mounted on a circuit board 62 and include a plug 64 and an image expanding fiber optic face plate 60 mounted on the surface of the display 30 that facilitates tiling the display without visible seams between the display tiles, as shown for example in U.S. Pat. No. 4,613,210 issued Sep. 23, 1986 to Pollard. The display tiles 10 are mounted on a support 70 by mounting brackets 72. The support includes an array of sockets 74 for receiving the plugs 64. The communication links 11 are provided on the support 70 to connect the sockets 74 in series. The display controller 12 is also mounted on the support 70 and is connected to the first socket in a series.

In a preferred embodiment, the present invention is employed in a tiled flat-panel array of OLED display devices composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light emitting displays can be used to fabricate such a device.

The present invention provides a self-configuring mechanism for the distribution and display of tiled display systems without requiring the use of point-to-point communications or hardware devices directly connected to each display device from a common controller. This increases the robustness and flexibility of the display system and reduces communication problems. The invention has been described in detail with particular reference to certain preferred embodiments thereof, but it will be understood that variations and modifications can be effected within the spirit and scope of the invention.

PARTS LIST 8 tiled display
10 display tile
11 communication channel
12 display controller
13 common bus
14 image data source
20 image
22 image portion
30 array of display pixels
32 tile controller
33 clock
34 communication interface
36 memory
40 serially connected row of display tiles
42 row controller
44 high data rate communication channel
46 first row controller
52 communication interfaces
54 local memory
56 row control circuitry
60 fiber optic face plate
62 circuit board
64 plug
70 support
72 bracket
74 socket

What is claimed is:

1. A tiled display, comprising:
   a) a display controller for receiving image data for images of different sizes from an image data source and formatting the image data for display;
   b) a plurality of display tiles, each display tile having an array of display pixels, a tile controller, a clock, a memory and a communication interface, wherein the tile controllers are each programmed to compute a portion of the images of different sizes to be stored in the associated tile memory; and
   c) the display tiles being serially connected through the communication interfaces, with one display tile being connected to the display controller, the display controller sending image data to the one display tile for an image to be displayed on the serially connected display tiles, and each display tile successively storing the portion of image data to be displayed on its array of display pixels and transmitting only remaining image data to the next display tile in the series.

2. The tiled display claimed in claim 1, wherein the tiled display comprises a two dimensional array of display tiles connected in series.

3. The tiled display claimed in claim 1, wherein the display controller incorporates a display tile that acts as the first display tile in the series.

4. The tiled display claimed in claim 1, wherein the display pixels are OLEDs.

5. The tiled display claimed in claim 1, wherein the display tiles are identical.

6. The tiled display claimed in claim 1, wherein the tiled display has an aspect ratio and the tile controllers include means for adapting image data formatted by the display controller having an aspect ratio different from the aspect ratio of the tiled display.

7. The tiled display claimed in claim 1, wherein the tile controllers include means for changing the resolution of the image data formatted by the display controller.

8. The tiled display claimed in claim 1, wherein the tile controllers include means for calculating the time for image data distribution to all of the display tiles in the display and for displaying the image data after all of the display tiles have received the image data.

9. The tiled display claimed in claim 1, wherein the tile controllers include means for determining their locations in the tiled display and storing in respective memories a portion of the image data corresponding to their locations in the tiled display.

10. A tiled display, comprising:
 a) a display controller for receiving image data for images of different sizes from an image data source and formatting the image data for display;
 b) a plurality of display tiles, each display tile having an array of display pixels, a tile controller, a clock, a memory and a communication interface, wherein the tile controllers are each programmed to compute a portion of the images of different sizes to be stored in the associated tile memory; and
 c) the display tiles being serially connected through the communication interfaces, with one display tile being connected to the display controller, the display controller sending image data to the one display tile for an image to be displayed on the serially connected display tiles, and each display tile successively storing the portion of image data to be displayed on its array of display pixels and transmitting any remaining image data to the next display tile in the series; further comprising a plurality of linear arrays, each linear array comprising a display controller and serially connected display tiles, and wherein the display controllers of the plurality of linear arrays are connected in series and one of the display controllers receives image data from the image data source.

* * * * *